United States Patent
Matsushita et al.

(10) Patent No.: US 10,339,412 B2
(45) Date of Patent: Jul. 2, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Masahiro Matsushita, Yokohama (JP); Hirotaka Shiiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/421,101

(22) Filed: Jan. 31, 2017

(65) Prior Publication Data

US 2017/0220895 A1     Aug. 3, 2017

(30) Foreign Application Priority Data

Feb. 2, 2016     (JP) ................................. 2016-018420

(51) Int. Cl.
*G06K 9/46*     (2006.01)
*G06K 9/62*     (2006.01)
*G06T 7/33*     (2017.01)

(52) U.S. Cl.
CPC ......... *G06K 9/4671* (2013.01); *G06K 9/6215* (2013.01); *G06T 7/33* (2017.01)

(58) Field of Classification Search
CPC ....... G06K 9/4671; G06K 9/6215; G06T 7/33
See application file for complete search history.

(56) References Cited

U.S. PATENT DOCUMENTS

| 2008/0215548 | A1* | 9/2008 | Ohasi et al. | G06F 7/16 707/3 |
| 2011/0019003 | A1* | 1/2011 | Asa | G06K 9/00221 348/159 |
| 2015/0039583 | A1* | 2/2015 | Liu | H04L 67/42 707/706 |

FOREIGN PATENT DOCUMENTS

JP     2009-284084 A     12/2009

OTHER PUBLICATIONS

Chris Harris, Mike Stephens, A combined corner and edge detector, Alvey Vision Conference 1988, pp. 147-152.
David G. Lowe, Distinctive Image Features from Scale-Invariant Keypoints, International Journal of Computer Vision, 2004, pp. 1-28.

* cited by examiner

*Primary Examiner* — Gregory M Desire
(74) *Attorney, Agent, or Firm* — Canon U.S.A., Inc. IP Division

(57) ABSTRACT

When searching for a registered image similar to a query image, an image processing apparatus estimates an area having a difference by comparing images determined to be similar if a plurality of similar images is found at the time of search of a similar image using an image feature amount in order to enhance search accuracy. Then, the image processing apparatus compares the query image with the plurality of images similar to the query image based on the difference area.

13 Claims, 16 Drawing Sheets

FIG. 4

IMAGE FEATURE AMOUNT DATABASE

| IMAGE ID | NUMBER OF FEATURE POINTS | FEATURE POINT 1 | FEATURE AMOUNT 1 | FEATURE POINT 2 | FEATURE AMOUNT 2 | ... |
|---|---|---|---|---|---|---|
| 1 | 987 | 23, 57 | 15, 235, 124, ... | 54, 34 | 32, 41, 127, ... | ... |
| 2 | 1012 | 38, 156 | 34, 167, 354, ... | 125, 44 | 124, 15, 64, ... | ... |
| 3 | 1122 | 12, 364 | 141, 25, 3, ... | 36, 478 | 104, 25, 31, ... | ... |
| ... | ... | ... | ... | ... | ... | ... |

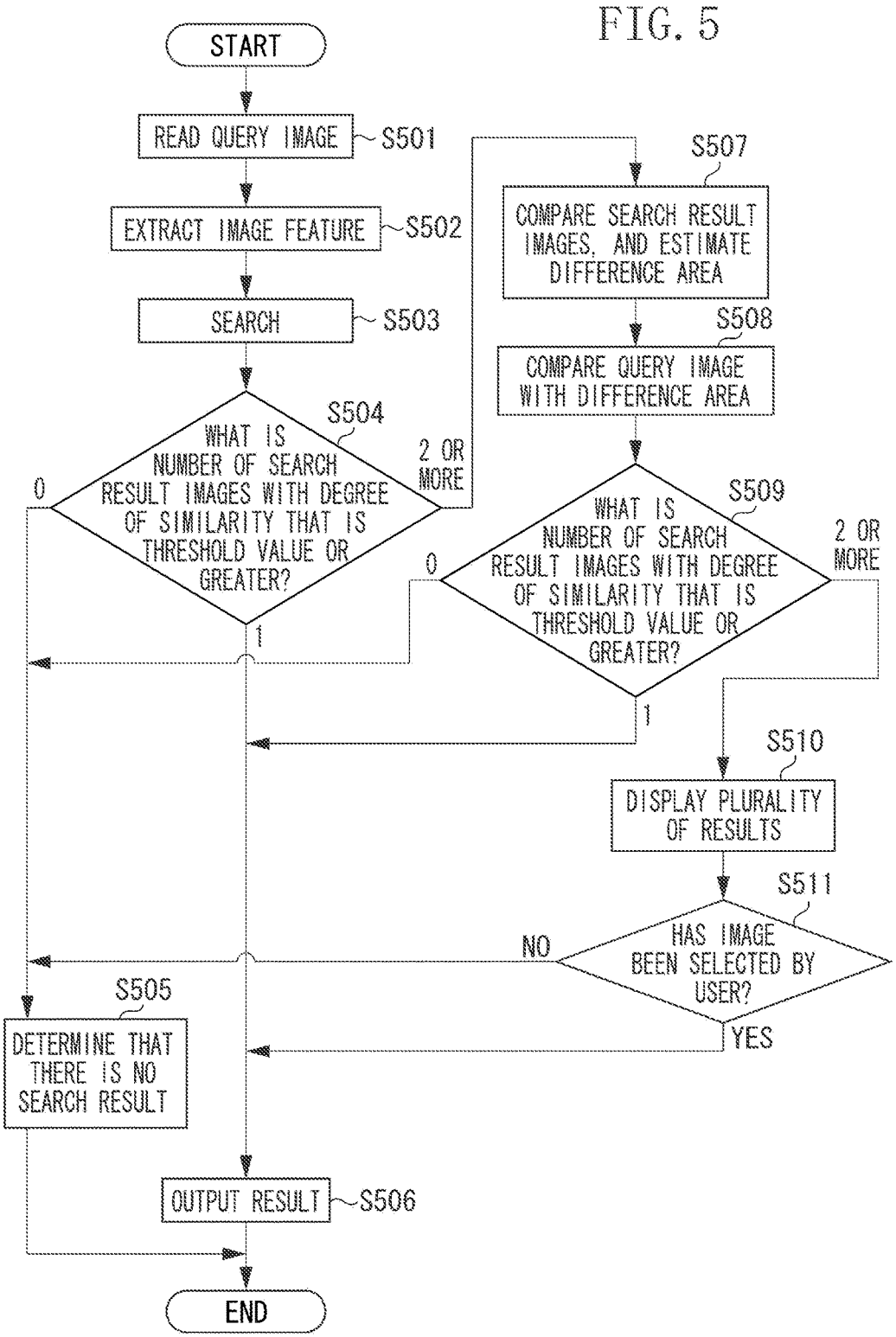

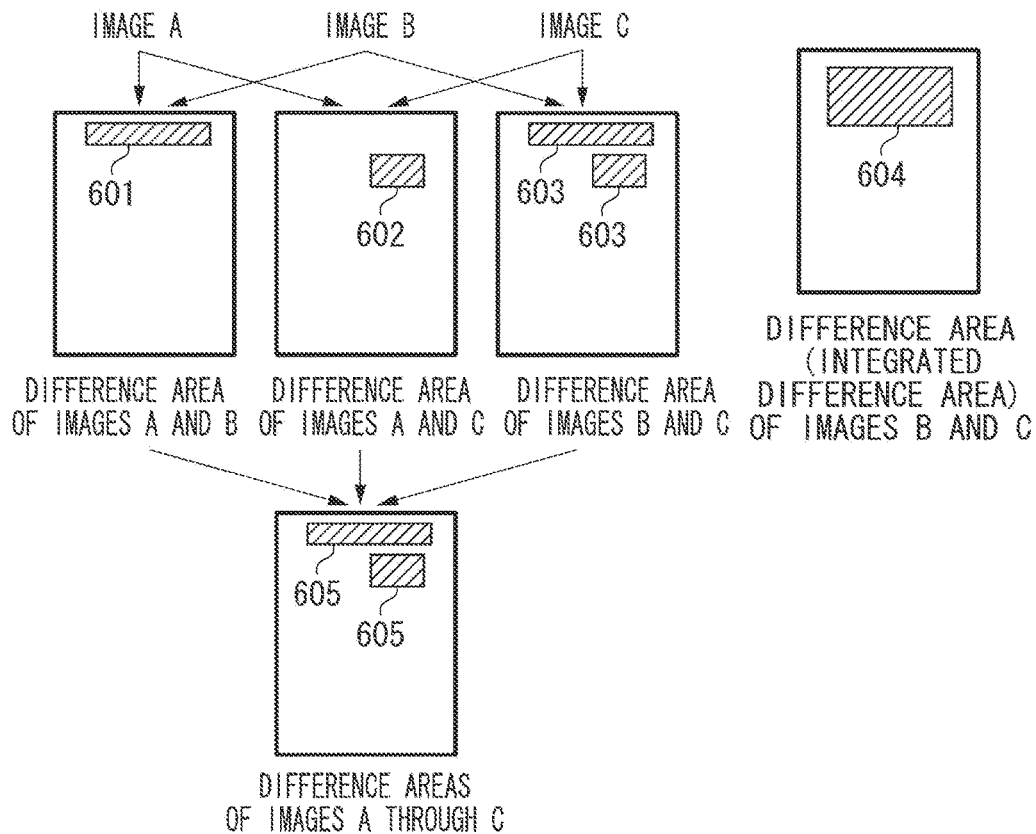

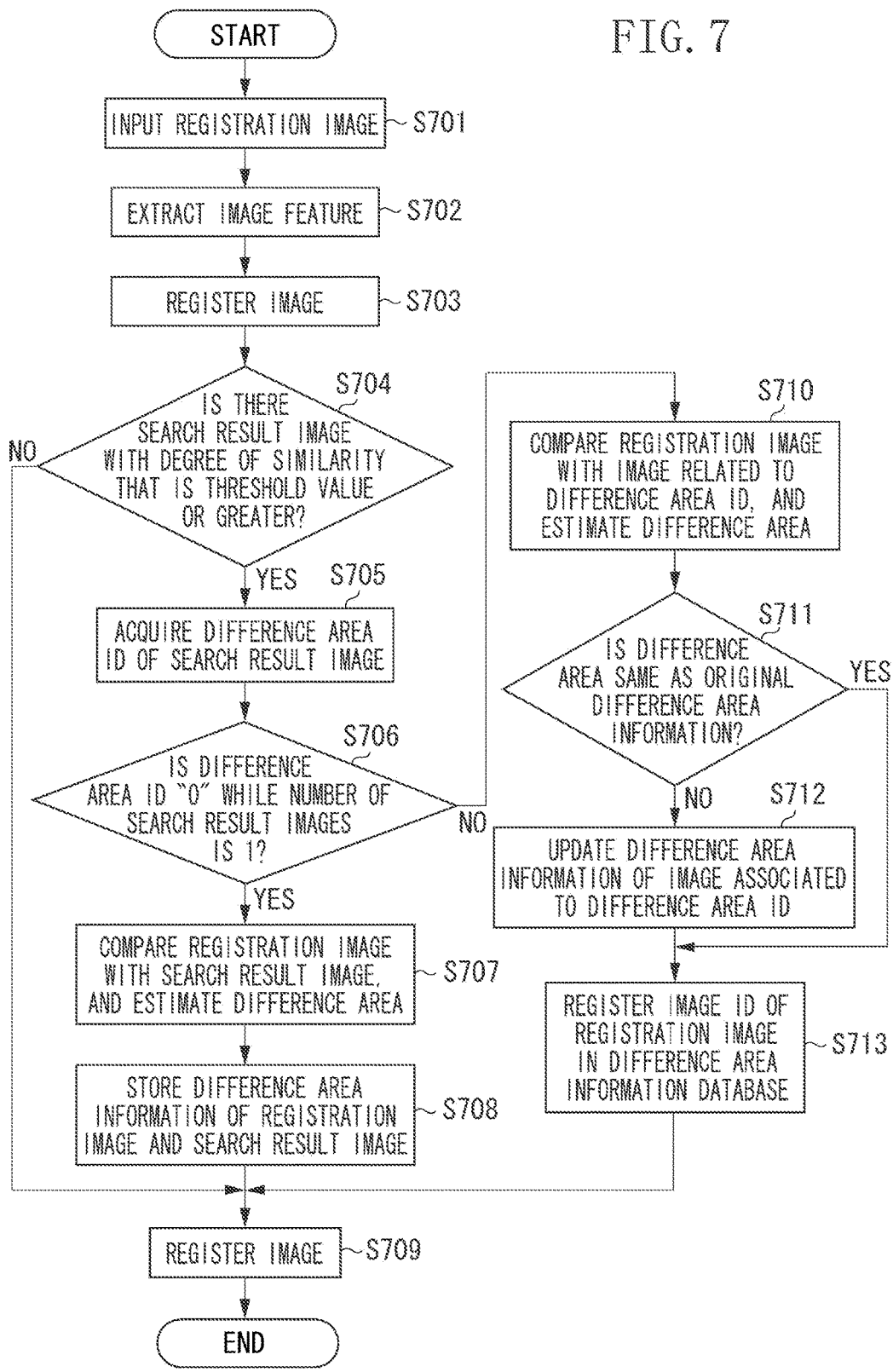

FIG. 8A

IMAGE FEATURE AMOUNT DATABASE

| IMAGE ID | NUMBER OF FEATURE POINTS | FEATURE POINT 1 | FEATURE AMOUNT 1 | FEATURE POINT 2 | FEATURE AMOUNT 2 | ... | DIFFERENCE AREA ID |
|---|---|---|---|---|---|---|---|
| 1 | 987 | 23, 57 | 15, 235, 124, ... | 54, 34 | 32, 41, 127, ... | ... | 1 |
| 2 | 1012 | 38, 156 | 34, 167, 354, ... | 125, 44 | 124, 15, 64, ... | ... | 2 |
| 3 | 1122 | 12, 364 | 141, 25, 3, ... | 36, 478 | 104, 25, 31, ... | ... | 1 |
| 4 | 823 | 44, 55 | 28, 34, 66, ... | 84, 99 | 15, 253, 44, ... | ... | 0 |
| ... | ... | ... | ... | ... | ... | ... | ... |

FIG. 8B

DIFFERENCE AREA INFORMATION DATABASE

| DIFFERENCE AREA ID | NUMBER OF DIFFERENCE AREAS | DIFFERENCE AREA 1 | DIFFERENCE AREA 2 | ... | NUMBER OF IMAGES | IMAGE ID 1 | IMAGE ID 2 | ... |
|---|---|---|---|---|---|---|---|---|
| 1 | 2 | 50, 70, 880, 40 | 620, 80, 75, 30 | ... | 2 | 1 | 3 | ... |
| 2 | 3 | 650, 300, 250, 60 | 50, 330, 40, 50 | ... | 3 | 2 | 5 | ... |
| ... | ... | ... | ... | ... | ... | ... | ... | ... |

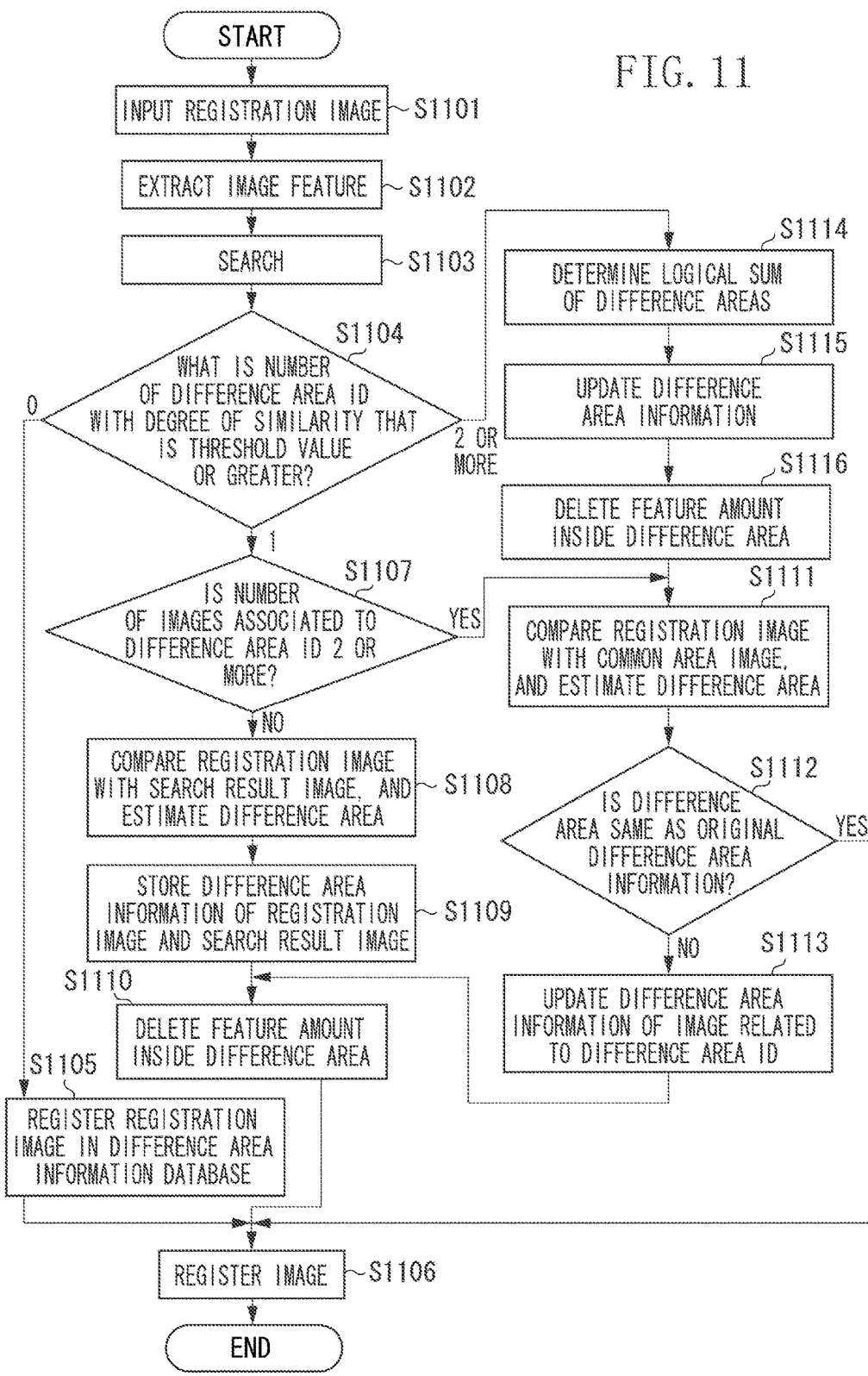

FIG. 12A

IMAGE FEATURE AMOUNT DATABASE

| IMAGE ID | NUMBER OF FEATURE POINTS | FEATURE POINT 1 | FEATURE AMOUNT 1 | FEATURE POINT 2 | FEATURE AMOUNT 2 | ... | DIFFERENCE AREA ID |
|---|---|---|---|---|---|---|---|
| 1 | 987 | 23, 57 | 15, 235, 124, ... | 54, 34 | 32, 41, 127, ... | ... | 1 |
| 2 | 1012 | 38, 156 | 34, 167, 354, ... | 125, 44 | 124, 15, 64, ... | ... | 2 |
| 3 | 1122 | 12, 364 | 141, 25, 3, ... | 36, 478 | 104, 25, 31, ... | ... | 1 |
| 4 | 823 | 44, 55 | 28, 34, 66, ... | 84, 99 | 15, 253, 44, ... | ... | 3 |
| ... | ... | ... | ... | ... | ... | ... | ... |

FIG. 12B

DIFFERENCE AREA INFORMATION DATABASE

| DIFFERENCE AREA ID | NUMBER OF DIFFERENCE AREAS | DIFFERENCE AREA 1 | DIFFERENCE AREA 2 | ... | NUMBER OF IMAGES | IMAGE ID 1 | IMAGE ID 2 | ... | NUMBER OF FEATURE POINTS | FEATURE POINT 1 | FEATURE AMOUNT |
|---|---|---|---|---|---|---|---|---|---|---|---|
| 1 | 2 | 50, 70, 880, 40 | 620, 80, 75, 30 | ... | 2 | 1 | 3 | ... | 715 | 23, 57 | 15, 235, 124, ... |
| 2 | 3 | 650, 300, 250, 60 | 50, 330, 40, 50 | ... | 3 | 2 | 5 | ... | 865 | 38, 156 | 34, 167, 364 ... |
| 3 | 0 | | | ... | 1 | 4 | | ... | 823 | 44, 55 | 28, 34, 66 ... |
| ... | ... | ... | ... | ... | ... | ... | ... | ... | ... | ... | ... |

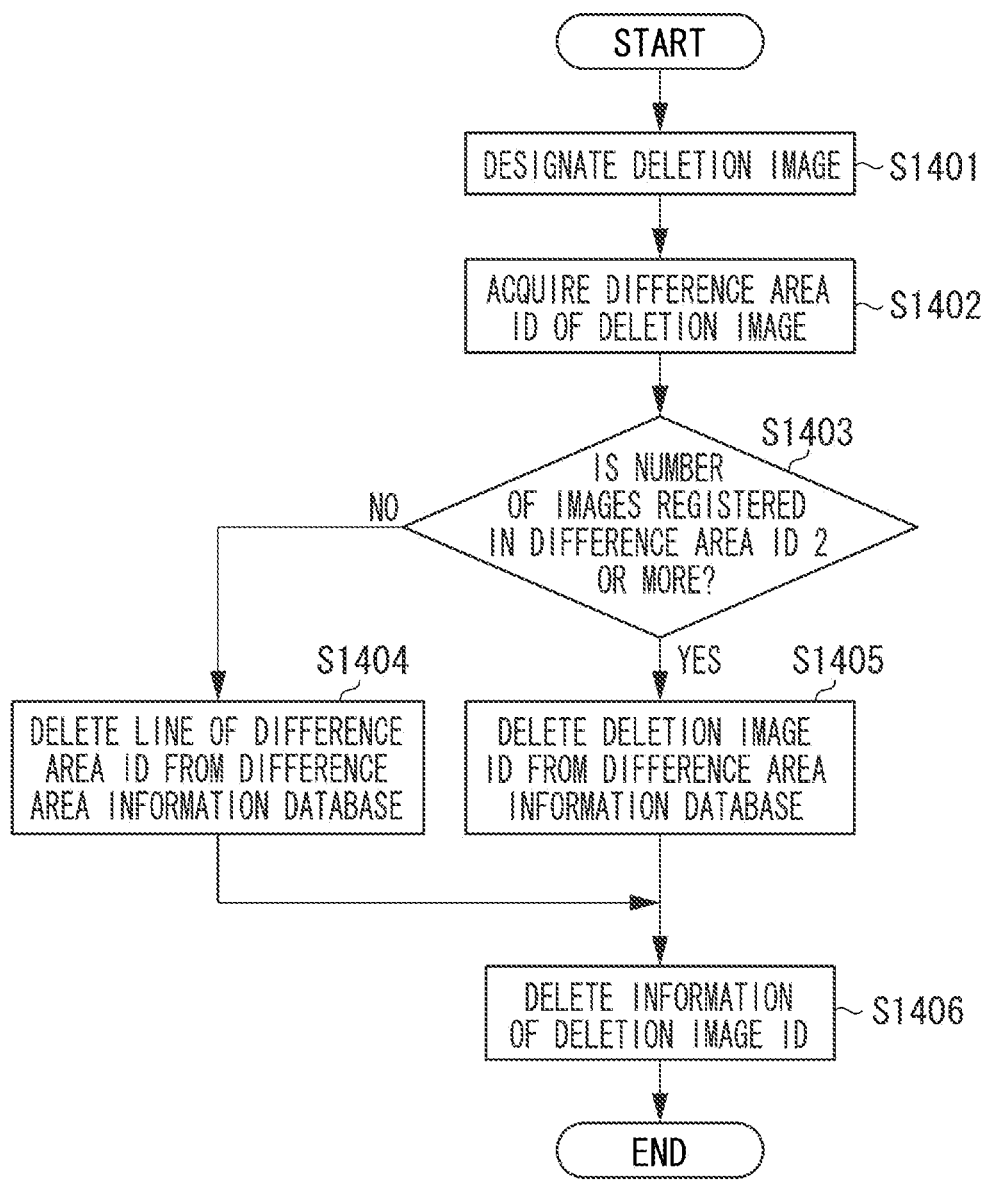

IMAGE PROCESSING APPARATUS, IMAGE PROCESSING METHOD, AND STORAGE MEDIUM

BACKGROUND

Field of the Disclosure

The present disclosure relates to a technique for searching for a registered image similar to a query image.

Description of the Related Art

A method for searching for a similar image using a local feature amount of an image has been discussed. According to such a method, a feature point (a local feature point) is extracted from an image ("A combined corner and edge detector", by C. Harris, and M. J. Stephens, In Alvey Vision Conference, pp. 147-152 (1988)). Then, a feature amount (a local feature amount) corresponding to the local feature point is calculated based on the local feature point and image information about the vicinity of the local feature point ("Distinctive Image Features from Scale-Invariant Keypoints", by David G. Lowe, International Journal of Computer Vision, 60, 2. pp. 91-110 (2004)).

In the method using the local feature amount, the local feature amount is defined as information including a scale-invariant. This enables an image to be searched even if the image is rotated, enlarged, or reduced. In general, the local feature amount is expressed as a vector. Theoretically, the local feature amount rotation-invariant and scale-invariant. However, in an actual digital image, local feature amounts acquired before a rotation, enlargement, or reduction process is performed on the image and corresponding local feature amounts acquired after the rotation, enlargement, or reduction process is performed on the image slightly differ.

For extraction of a rotation-invariant local feature amount discussed in, for example, "Distinctive Image Features from Scale-Invariant Keypoints", by David G. Lowe, International journal of Computer Vision, 60, 2, pp. 91-110 (2004), a main direction is calculated from a pixel pattern of a local area in the vicinity of the local feature point, and a direction is normalized by rotating the local area using the main direction as a reference when a local feature amount is calculated. Moreover, different scale images are internally generated for calculation of a scale-invariant local feature amount, and extraction of a local feature point and calculation of the local feature amount are performed from each of the different scale images. A collection of the internally generated different scale images is generally called a scale space.

According to the above method, a plurality of local feature points is extracted from an image of one sheet. In the image search using the local feature amount, local feature amounts calculated from the respective local feature points are compared to undergo matching. A widely used voting method (Japanese Patent Application Laid-Open No. 2009-284084) performs a nearest neighbor process to determine whether there is a feature point that is similar to a local feature amount of each of feature points extracted from a query image by a predetermined threshold value or greater. If there such a feature point, one vote is cast with respect to the "image". The larger the number of votes, the more similarity.

The technique discussed in Japanese Patent Application Laid-Open No. 2009-284084 searches for an image by using image shape similarity and color similarity. Thus, for example, in a case where a plurality of images in which only one portion of each image is changed is registered in a database, the plurality of images can be acquired as search results. That is, such a plurality of images has higher similarity than other images. A large portion of each of the plurality of images is the same, and only a small portion differs. This causes difficulty in generating a difference in similarity of the plurality of images. Consequently, there are cases where an image similar to a query image cannot be identified from the plurality of images. Accordingly, there a need to enhance search accuracy at the time of search of a registered image similar to a query image.

SUMMARY

According to an aspect of the present disclosure, an image processing apparatus includes an input unit configured to input an image, an extraction unit configured to extract an image feature of the input image, a storage unit configured to store a plurality of registered images that serve as search targets for a query image, a search unit configured to search for an image similar to the query image from among the plurality of registered images based on the image feature extracted by the extraction unit from the query image input by the input unit to acquire a search result image, and a comparison unit configured, if a plurality of search result images is acquired by the search unit, to compare a difference area between the plurality of search result images with the query image.

Further features of the present disclosure will become apparent from the following description of exemplary embodiments with reference to the attached drawings.

BRIEF DESCRIPTION OF THE DRAWINGS

FIG. 4 is a table illustrating a registration format of an image feature amount database according to one or more aspects of the present disclosure.

FIG. 5 is a flowchart of an image search process performed by the image processing apparatus according to one or more aspects of the present disclosure.

FIGS. 6A and 6B are tables illustrating a method for estimating a difference area if a plurality of similar images is present according to one or more aspects of the present disclosure.

FIG. 7 is a flowchart of an image registration process performed by an image processing apparatus according to one or more aspects of the present disclosure.

FIGS. 8A and 8B are tables respectively illustrating a registration format of an image feature amount database and a registration format of a difference area information database according to one or more aspects of the present disclosure.

FIG. 11 is a flowchart of an image registration process performed by an image processing apparatus according to one or more aspects of the present disclosure.

FIGS. 12A and 12B are tables respectively illustrating a registration format of an image feature amount database and a registration format of a difference area information database according to one or more aspects of the present disclosure.

FIG. 14 is a flowchart of an image deletion process performed by the image processing apparatus according to one or more aspects of the present disclosure.

DESCRIPTION OF THE EMBODIMENTS

A first exemplary embodiment of the present disclosure is hereinafter described in detail with reference to the drawings. The present exemplary embodiment is described based on an assumption that a plurality of images in which only one portion of each of the images is changed is registered in a database, and an image that is most similar to a query image is searched from the plurality of images registered in the database. The following cases are assumed. In a case where advertisement leaflets for a company managing a plurality of stores are printed, a plurality of types of leaflets in which only a store name and a telephone number are changed may be printed. Moreover, in a case where similar events are held for a plurality of times, a plurality of types of leaflets in which only a date is changed may be printed. Original data of these leaflets is registered in a database, and the original data is searched based on a printed leaflet at hand.

In the present exemplary embodiment, assume that a plurality of rasterized images as registration images is registered in a database when printing is performed using the software that has created a document. Moreover, assume that an image of a sheet on which any of registration images is printed is captured by a camera, and such an image serves as a query image.

First, a hardware configuration of an image processing apparatus of the present exemplary embodiment is described with reference to a block diagram illustrated in FIG. 1. The image processing apparatus includes a server apparatus or a client apparatus. Each of the server apparatus or the client apparatus may be realized by a single computer apparatus or may be realized by the required number of computer apparatuses by distributing functions thereto. If the server apparatus and the client apparatus each include the plurality computer apparatuses, the computer apparatuses are connected via, for example, local area network (LAN) as to be communicable with each other. The computer apparatus can include information processing apparatus such as a personal computer (PC) and a workstation (WS).

Figure 1:
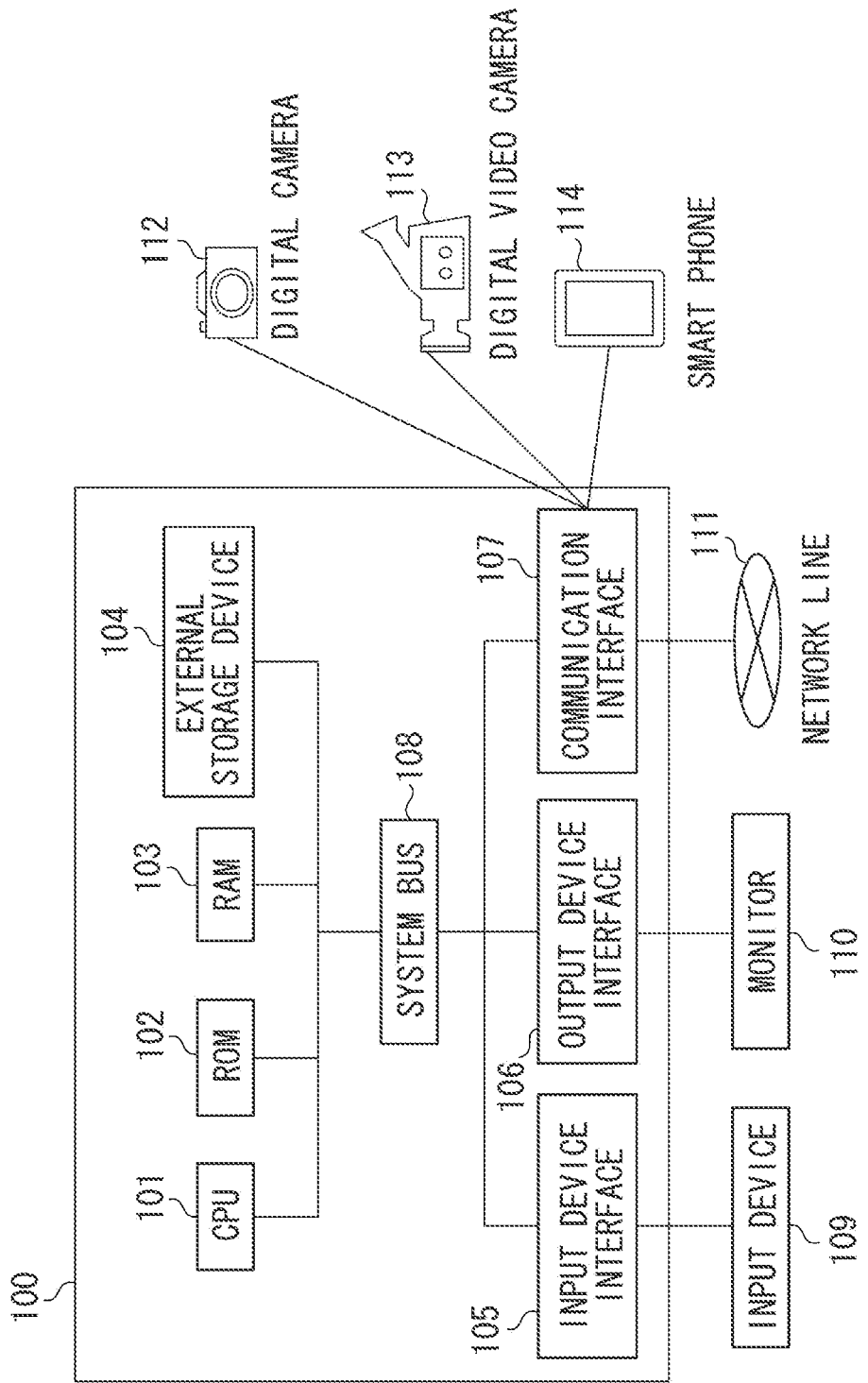
FIG. 1 is a block diagram illustrating a hardware configuration of an image processing apparatus according to one or more aspects of the present disclosure.

In the image processing apparatus illustrated FIG. 1, central processing unit (CPU) 101 comprehensively controls a computer apparatus 100, A read only memory (ROM) 102 stores a program or a parameter that does not need to be changed. A random access memory (RAM) 103 temporarily stores a program or data supplied from an external apparatus. An external storage device 104 is a storage device such as a memory card and a hard disk that is fixed to the computer apparatus 100. The external storage device 104 may include an optical disk such as a flexible disk (FD) and a compact disk (CD), a magnetic or optical card, an integrated circuit (IC) card, and a memory card that are detachable from the computer apparatus 100. An input device interface 105 is an interface with an input. device 109 for accepting an operation from a user and inputting data, such as pointing device and a keyboard.

An output device interface 106 is an interface with a monitor 110 for displaying data retained by the computer apparatus 100 and supplied data. A communication interface 107 connects a network line 111 such as the Internet, a digital camera 112, a digital video camera 113, and a smart phone 114 to the computer apparatus 100. A system bus 108 serving as a transmission path communicably connects units 101 through 107 with each other. In the present exemplary embodiment, the CPU 101 executes a program stored in a computer readable storage medium such as the ROM 102, so that a process of each of the flowcharts described below is realized.

Figure 2:
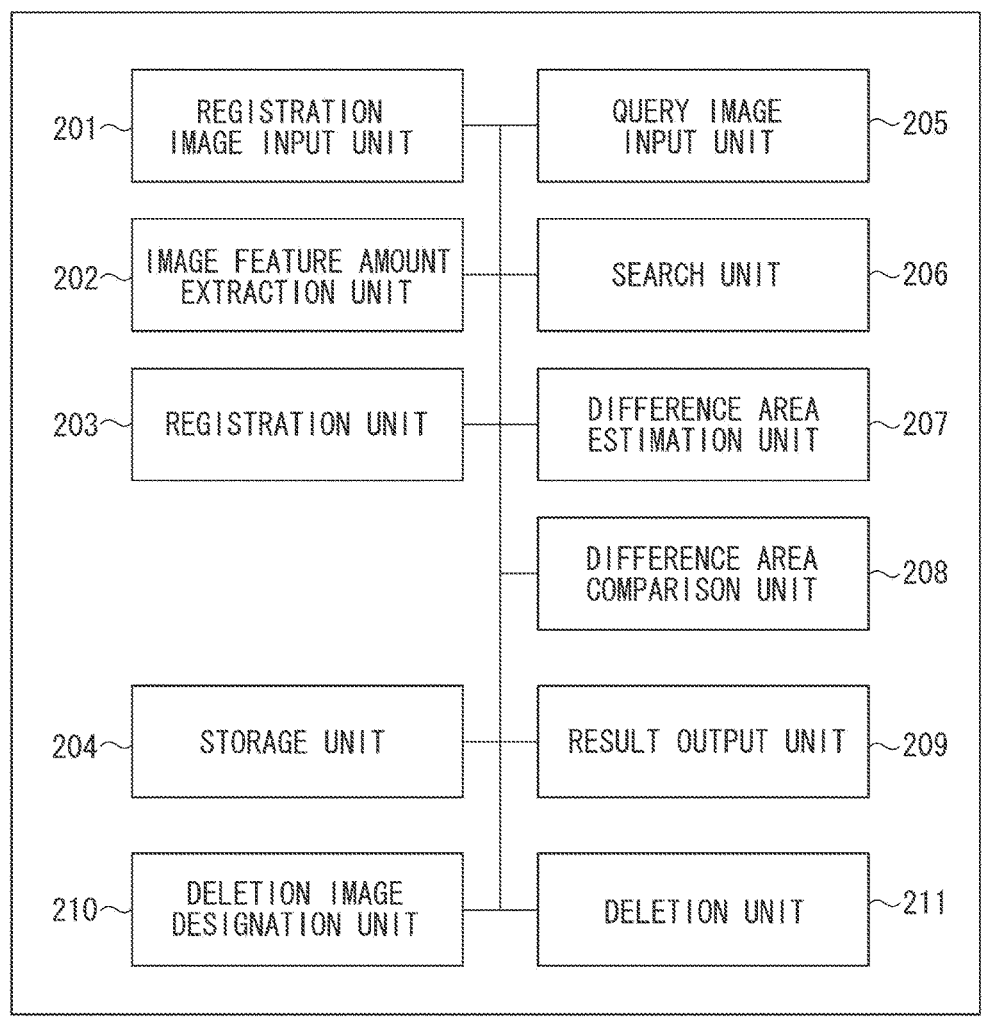
FIG. 2 is a block diagram illustrating a software configuration of the image processing apparatus according to one or more aspects of the present disclosure.

FIG. 2 is a block diagram illustrating a software configuration of the image processing apparatus according the present exemplary embodiment. In FIG. 2, a registration image input unit 201 inputs comparison target image (a registration image). A query image input unit 205 inputs an image (a query image) serving as a search source.

An image feature amount extraction unit 202 extracts an image feature amount from a registration image or a query image. The image feature amount extraction unit 202 functions as a feature point extraction unit for extracting a local feature point from each image and as a feature extraction unit for extracting a local feature regarding the extracted local feature point. A registration unit 203 registers an image feature amount of the registration image in a storage unit 204 such as a memory and a hard disk drive (HDD). The storage unit 204 stores in-process data.

A search unit 206 compares an image feature amount of the query image serving as a search source with an image feature amount of an image that has been already registered (a registered image) to search for a similar Image. If there is a plurality of search results each having a predetermined degree of similarity or higher, a difference area estimation unit 207 compares the plurality of search results to estimate an area that has a difference (a difference area). A difference area comparison unit 208 compares the query image with a difference area of the search result images. A result output unit 209 outputs a search result, i.e., image information, to a corresponding functional unit for a process to be described below, or displays the image information of the search result on a display unit.

A deletion image designation unit 210 designates an image that is intended to be deleted from a search target, and a deletion unit 211 deletes an image feature amount of the designated image from the storage unit 204. Each of these components is comprehensively controlled by the CPU 101.

Figure 3:
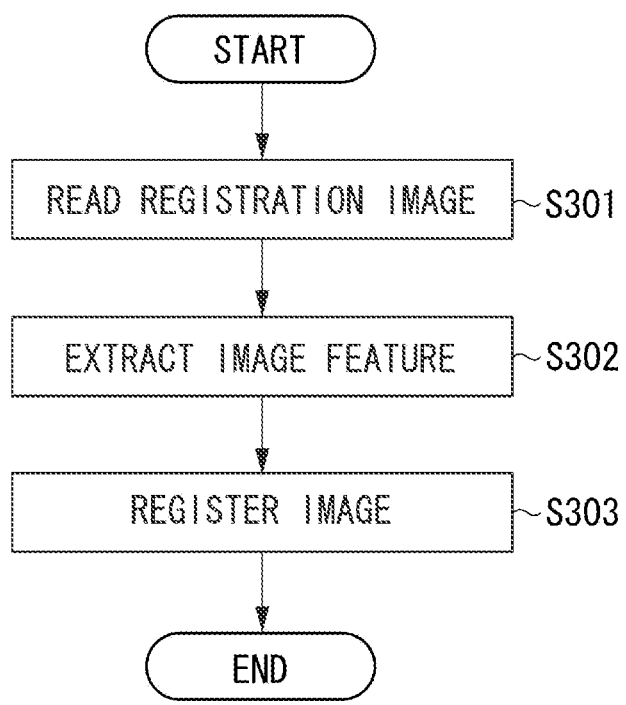
FIG. 3 is a flowchart of an image registration process performed by the image processing apparatus according to one or more aspects of the present disclosure.

FIG. 3 is a flowchart illustrating one example of an image registration process performed by the image processing apparatus according to the present exemplary embodiment. In step S301, the registration image input unit 201 reads a registration image. In step S302, the image feature amount extraction unit 202 extracts an image feature of the registration image read in step S301. The image feature amount extraction unit 202 first extracts a local feature point that can be robustly extracted even if the image is rotated. Herein, Harris operator ("A combined corner and edge detector", by C. Harris, and M. C. Stephens, In Alvey Vision Conference, pp. 147-152, (1988)) is used as a method for extracting such a local feature point.

In particular, regarding a pixel on an output image H and acquired using Harris operator, the image feature amount extraction unit 202 checks a pixel value of the pixel and pixel values of 8 pixels in the vicinity of the pixel (a total of 9 pixels). Then, the image feature amount extraction unit 202 extracts a point in which the pixel is locally maximal (a pixel value of the pixel is maximum among the 9 pixels) as a local feature point. Herein, even in a case where the pixel is locally maximal, if a value of the pixel is a threshold value or less, the mage feature amount extraction unit 202 does not extract such a point as a local feature point. The feature point extraction method is not limited to Harris operator. Any feature point extraction method can be applied as long as a local feature point can be extracted.

Then, the image feature amount extraction unit 202 calculates a feature amount (a local feature) of the extracted local feature point. As for the local feature, a known technique such as scale-invariant feature transform (SIFT), speeded up robust features (SURF), and features from accelerated segment test (FAST) can be used. In step S303, the registration unit 203 registers the extracted image feature in an image feature amount database in association with the image. In other words, the registration unit 203 allocates an image identification (ID) to the registration image, and registers the number of feature points. Then, the registration unit 203 registers a position (coordinates) of the feature point for the number of feature points, and a feature amount corresponding to each of the feature points. FIG. 4 is a table schematically illustrating a registration format of the image feature amount database according to the present exemplary embodiment. The format illustrated in FIG. 4 is one example of the registration format according to the present exemplary embodiment. The exemplary embodiment of the present disclosure is not limited thereto.

FIG. 5 is a flowchart illustrating one example of image search processing procedures performed by the image processing apparatus according to the present exemplary embodiment. In step S501, the query image input unit 205 reads a query image. Examples of the query image input methods include a method for reading an image captured by a camera connected to the image processing apparatus in a wired or wireless manner, and a method for selecting an image from images stored in a storage unit (e.g., the storage unit 204) of the image processing apparatus. Subsequently, in step S502, the image feature amount extraction unit 202 extracts an image feature amount from the input query image in a similar manner to the extraction from the registration image.

In step S503, the search unit 206 searches for an image similar to the input query image from registered images. For the similar image search, a known technique such as the voting method discussed in Japanese Patent Application Laid-Open No. 2009-284084 can be applied. In other words, for each feature point extracted from the query image, a vote is cast for an image in which a feature point similar to an image feature amount of the feature point by a predetermined threshold value or greater is present. One vote can be cast with respect to each feature point, or a weighted vote can be cast based on a degree of similarity of the image feature amount or a distance. The number of votes acquired by the voting method is normalized to acquire the degree of similarity. The normalization performed by dividing the number of votes by the number of image feature amounts of the query image or the registered image.

In step S504, the search unit 206 determines whether there is a registered image (a search result image) with a degree of similarity that is a threshold value or greater. If the search unit 206 determines that there is no search result image (0 in step S504), the processing proceeds to step S505. In step S505, since there is no search result (a search result image), the processing is terminated. Herein, a process for prompting to input a query image again may be performed. If the search unit 206 determines that there is one search result image (1 in step S504), the processing proceeds to step S506. In step S506, since the result is uniquely determined, the result output unit 209 outputs the result. Then, the processing is terminated. On the other hand, if the search unit 206 determines that there are two or more search result images as search results (2 OR MORE in step S504), the processing proceeds to step S507.

In step S507, the difference area estimation unit 207 compares the search result images with each other, and estimates a difference area. Herein, if there are two search result images, the difference area estimation unit 207 compares these two images and estimates a difference area therebetween. If there are three or more search result images, the difference area estimation unit 207 compares two of the images each time, and integrates the comparison results to estimate an area having a difference as a difference area.

FIGS. 6A and 6B are diagrams illustrating a method for estimating a difference area in a case where a plurality of search result images is present. FIG. 6A illustrates a case where there are three images A, B, and C as search result images. In such a case, the difference area estimation unit 207 compares the image A with the image B, the image A with the image C, and the image B with the image C, and estimates respective differences areas 601, 602, and 603. According to the comparison between the images B and C as illustrated in FIG. 6A, a plurality of estimated difference areas may exist. In such a case, these areas may be integrated into a single difference area 604 as illustrated in FIG. 6B. The difference area estimation unit 207 estimates a difference area 605 of the images A though C based on a logical sum of the difference areas determined with respect to each combination of two images.

Herein, a detailed description is given of a process for estimating a difference area according to the present exemplary embodiment. In the present exemplary embodiment, two images are overlapped so that a difference in pixel values is acquired for each pixel. If a pixel has an absolute value of the difference of zero (or a predetermined value close to zero) or greater, the pixel is identified to have a difference. Then, an area enclosed by a rectangular including the identified pixel is determined to be a difference area. The difference area may be formed in a polygonal shape or an indefinite shape instead of the rectangular shape. In a case where areas having differences are spaced apart, these areas may be considered as separate difference areas. Moreover, in a state in which registered images shift in position from each other or rotate, positioning is performed using random sample consensus (RANSACK) discussed in non-patent literature document entitled "Distinctive Image Features from Scale-Invariant Keypoints", by David G. Lowe, International Journal of Computer Vision, 60, 2, pp. 91-110 (2004). Then, a difference area can be estimated.

Returning to the description of the flowchart illustrated in FIG. 5, in step S508, the difference area comparison unit 208 compares the query image with the search result images determined in step S504. In this comparison, the aforementioned voting method cart be used. A difference from the voting in step S503 is that a vote is cast if the feature point similar to the image feature amount of each feature point extracted from the query image by a predetermined threshold value or greater "is present within the difference area". With the voting method, more votes are cast for a registered image truly similar to the query image, and fewer votes are cast for other images. Hence, a marked difference is generated. For example, in a case assumed in the present exemplary embodiment, more votes are cast for original data of the query image. Accordingly, the number of votes acquired by the voting method is normalized to acquire a degree of similarity. In the normalization, the number of votes is divided by, for example, the largest number of image feature amounts of the difference area.

Subsequently, in step S509, the difference area comparison unit 208 determines whether the search result image is present. If the difference area comparison unit 208 determines that the search result image is not present (0 in step S509), the processing proceeds to step S505. In step S505, since there is no image similar to the query image, the processing is terminated. Herein, a process for prompting to input a query image again may be performed. If the difference area comparison unit 208 determines that there is one search result image (1 in step S509), the processing proceeds to step S506. In step S506, since the result is uniquely determined, the result output unit 209 outputs the result. Then, the processing is terminated.

In step S509, if the difference area comparison unit 208 determines that there are two or more search result images (2 OR MORE in step S509), the processing proceeds to step S510. In step S510, the result output unit 209 displays the plurality of results on a display unit to prompt a user to make a selection. In step S511, the result output unit 209 determines whether an image has been selected by the user. If the result output unit 209 determines that an image has not been selected by the user (NO in step S511), the processing proceeds to step S505 in which the processing is terminated since there is no image similar to the query image. Herein, a process for prompting to input a query image again may be performed. If the result output unit 209 determines that an image has been selected by the user (YES in step S511), the processing proceeds to step S506 in which the result output unit 209 outputs the search result. Then, the processing is terminated.

When an image is deleted from the registered image (the search target) registered in the image feature amount database, the deletion image designation unit 210 designates the corresponding image ID in the image feature amount database illustrated in FIG. 4, and the deletion unit 211 deletes a row of the designated ID.

According to the present exemplary embodiment, in a case where a plurality of similar images may be found in the similar image search using an image feature amount, the similar images are compared, so that an area having a difference is estimated. Then, a query image and each of the plurality of images similar to the query image are compared based on the difference area, so that a difference in a degree of similarity to the query image is generated between the plurality of similar images. Hence, the image truly similar to the query image data can be searched.

Next, a second exemplary embodiment of the present disclosure is described. In the present exemplary embodiment, when an image is registered, a similar image is searched from images that have been already registered. If there is a similar image, a difference area between the image and the similar image is estimated, and the image registered together with difference area information. In a case where, when search is performed based a query image, a plurality of registered images is determined to be similar to the query image, comparison with the query image is performed based on the difference area registered beforehand. In the present exemplary embodiment, such configuration can reduce a process load applied at the time of search, and shorten a duration of time from designation of a query image to display of a result. Hereinafter, the present exemplary embodiment is described in detail. However, components that are similar to those described above in the first exemplary embodiment will be given the same reference numerals as above and description thereof will be omitted.

Although a hardware configuration and a software configuration of the image processing apparatus according to the present exemplary embodiment are similar to those of the image processing apparatus according to the first exemplary embodiment, processes performed by some functional units of the image processing apparatus according to the present exemplary embodiment differ from those of the image processing apparatus according to the first exemplary embodiment. A search unit 206 of the present exemplary embodiment has a function of searching for a similar image by comparing image feature amounts of registered images with an image feature amount of a registration image serving as a search source in addition to the function described in the first exemplary embodiment. Moreover, in a case where there is a registered image having a predetermined degree of similarity or higher, a difference area estimation unit 207 compares the registered image which has been searched with the registration image to estimate a difference area. A registration unit 203 stores difference area information together with the image feature amount of the registration image in the storage unit 204. The difference area comparison unit 208 acquires the difference area information of a search result from the storage unit 204, and compares the registered image having the predetermined degree of similarity or higher with the query image again.

When an image is deleted from a registered image (a search target) registered in an image feature amount database, a deletion image designation unit 210 designates the corresponding image ID in the image feature amount database, and a deletion unit 211 deletes a row of the designated ID as in the first exemplary embodiment. The deletion unit 211 according to the present exemplary embodiment deletes the difference area information relating to the image feature amount of the image to be deleted from the search target.

FIGS. 8A and 8B are tables schematically illustrating, respectively, a registration format of an image feature amount database and a registration format of a difference area information database used for the image processing apparatus according to the present exemplary embodiment. The image feature amount database of the present exemplary embodiment illustrated in FIG. 8A has an item of a difference area ID in addition to the items in the format illustrated in FIG. 4 in the first exemplary embodiment. In the present exemplary embodiment, if there is no similar image in the registered images, a value "0" is registered in the difference area ID. If there is a similar image in the registered images, difference area information is registered in the difference area information database as illustrated in FIG. 8B, and the difference area ID is registered in the difference area ID of the image feature amount database. In the difference area information database as illustrated in FIG. 8B, a plurality of image IDs to be targeted as well as upper left coordinates, a width, and a height of a difference area of these images are registered as difference area information. The difference area is, for example, the area 605 illustrated in FIG. 6A.

FIG. 7 is a flowchart illustrating one example of an image registration process performed by the image processing apparatus according to the present exemplary embodiment. Operations in steps S701 and S702 of the flowchart illustrated in FIG. 7 are similar to those in steps 301 and 302 of the flowchart illustrated in FIG. 3 of the first exemplary embodiment. In step S703, using a registration image as a query image, an image similar to the registration image is searched from the registered images. The operation in step S703 is similar to that in step S503 of the flowchart illustrated in FIG. 5.

Subsequently, in step S704, the search unit 206 determines whether there is a registered image (a search result image) with a degree of similarity that is a threshold value or greater based on a result of the search performed in step S703. If the search unit 206 determines that there is no search result image (NO in step S704), the processing proceeds to step S709. In step S709, the registration unit 203 registers an image feature amount of the registration image in association with the image in the image feature amount database as illustrated in FIG. 8A. In the image feature amount database of the present exemplary embodiment, an item of the difference area ID is added. If there is no search result image, a value "0" is stored as the difference area ID. The value "0" used herein simply indicates the absence of a similar image. Alternatively, another value may be used. The format illustrated in each of FIGS. 8A and 8B is one example of the present exemplary embodiment and not limited thereto.

If the search unit 206 determines that there is a search result image (YES in step S704), the processing proceeds to step S705. In step S705, the difference area estimation unit 207 acquires the difference area AD associated with the search result image. If there is a plurality of search result images, the difference area estimation unit 207 acquires a difference area ID for each of the search result images. In step S706, the difference area estimation unit 207 determines whether the difference area ID is "0" while the number of search result images is 1. If the difference area estimation unit 207 determines that the difference area ID is "0" while the number of search result images is 1 (YES in step S706), the processing proceeds to step S707. If the determination result is any other than the determination result described above (NO in step S706), the processing proceeds to step S710.

In step S707, the difference area estimation unit 207 compares the registration image with the search result image, and estimates a difference area between the registration image and the search result image. The estimation method is similar to the operation in step S507 illustrated in FIG. 5 of the first exemplary embodiment. Subsequently, in step S708, the registration unit 203 registers the information about the difference area between the registration image and the search result image in the difference area information database as illustrated in FIG. 8B. Particularly, in step S708, the registration unit 203 allocates a new difference area ID(s) for the number of estimated difference areas, and registers the difference area information. Herein, the registration unit 203 registers upper left coordinates, a width, and a height of the difference area as information used to identify a position and size of each difference area. Moreover, the registration unit 203 registers the number of images that have served as sources for estimation of this difference area, and image IDs thereof.

In step S709, the registration unit 203 registers the image feature amount of the registration image in association with the image in the image feature amount database as illustrated in FIG. 8A. Herein, the registration unit 203 registers the difference area ID allocated in step S708. Moreover, the registration unit 203 changes the difference area ID of the search result image to the difference area ID allocated in the step S708, and registers the changed difference area ID.

In step S710, the difference area estimation unit 207 compares the registration image with each of the images having the image ID associated with the difference area ID acquired in step S705, and estimates a difference area thereof. The estimation method used herein is similar to that performed in step S507 of the flowchart illustrated in FIG. 5 of the first exemplary embodiment. In other words, a difference area is estimated with respect to each combination of two images, and a logical sum of the obtained difference areas is set as a final difference area.

In step S711, the difference area comparison unit 208 determines whether the difference area estimated Al step S710 coincides with the original difference area information. If the difference area comparison unit 208 determines that the difference area estimated in step S710 coincides with the original difference area information (YES in step S711), the processing proceeds to step S713. On the other hand, if the difference area comparison unit 208 determines that the difference area estimated in step S710 differs from the original difference area information (NO in step S711), the processing proceeds to step S712.

In step S712, the registration unit 203 updates the position of the difference area and the number of difference areas associated with the difference area ID acquired in step S705, and registers the updated position and the updated number of difference areas. If a plurality of difference area TDs is acquired in step S705, the registration unit 203 collects the image IDs registered in the plurality of difference area. IDs and registers the collected image IDs in one difference area ID. The difference area information is updated. Moreover, the registration unit 203 changes the difference area ID of the image ID, which is in the image feature amount database and registered in each of the difference area ID prior to the collection, to the newly collected difference area ID. Then, the deletion unit 211 deletes a row of the difference area ID that is no longer needed as a result of the collection.

In step S713, the registration unit 203 allocates a new image ID to the registration image, and registers the additional image ID of the registration image in the difference area ID newly registered in the difference area information database. Moreover, the registration unit 203 increments the number of images and registers the incremented number.

In step S709, the registration unit 203 associates the image feature amount of the registration image with the image, and stores the image feature amount associated with the image in the image feature amount database as illustrated in FIG. 8A. Moreover, the registration unit 203 changes the difference area ID in the image feature amount database to the difference area ID set in step S713 with respect to the search result image, and registers the changed difference area ID.

Figure 9:
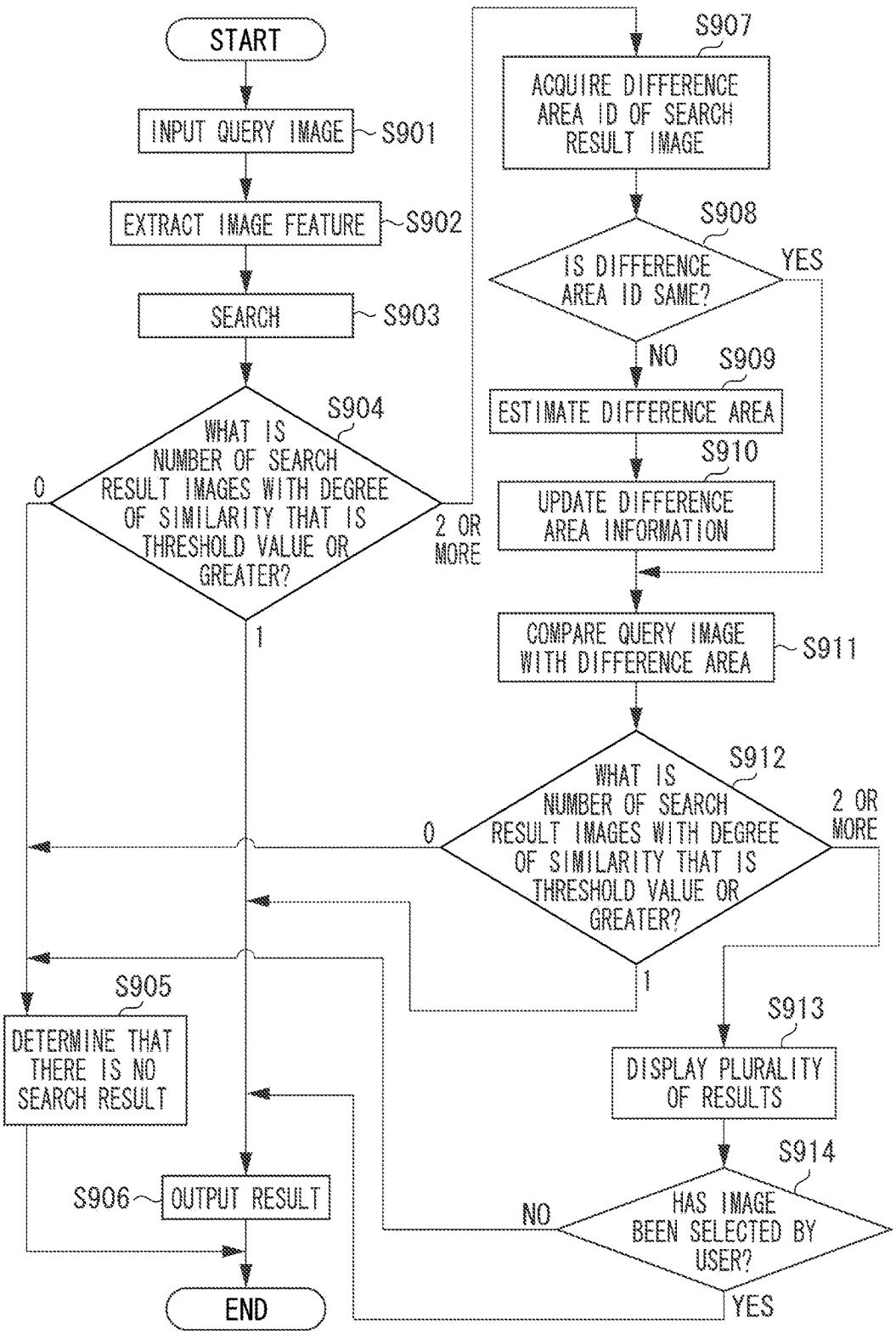
FIG. 9 is a flowchart of an image search process performed by the image processing apparatus according to one or more aspects of the present disclosure.

FIG. 9 is a flowchart illustrating one example of an image search process performed by the image processing apparatus according to the present exemplary Embodiment. Operations in steps S901 through S906 of the flowchart illustrated in FIG. 9 are similar to those in steps S501 through step S506 of the flowchart illustrated in FIG. 5 of the first exemplary embodiment. In step S907, the difference area estimation unit 207 acquires difference area IDs of a plurality of search result images from the image feature amount database. Subsequently, in step S908, the difference area estimation unit 207 determines whether the difference area IDs of the plurality of search result images coincide with each other. If the difference area estimation unit 207 determines that the difference area IDs of the plurality of search result images coincide with each other (YES in step S908), the processing proceeds to step S911. If the difference area estimation unit 207 determines that the difference area IDs of the plurality of search result images differ from each other (NO in step S908), the processing proceeds to step S909.

In step S909, the difference area estimation unit 207 estimates a difference area of the plurality of search result images. The estimation method used herein is similar to that used in step S507 of the flowchart illustrated in FIG. 5 of the first exemplary embodiment. In step S910, the registration unit 203 updates the difference area information database with the newly estimated difference area information. In other words, the image IDs registered in each of the plurality of difference area IDs are collected and registered in one difference area ID. The difference area IDs of the image IDs, which are in the image feature amount database and registered in each of the difference area IDs prior to the collection, are changed to the newly registered difference area IDs subsequent to the collection. Then, the deletion unit 211 deletes a row of the difference area ID that is no longer needed as a result of the collection.

According to the image search process of the present exemplary embodiment, information in the image feature amount database and the difference area information database is appropriately updated, so that the operations in steps S909 and S910 can be omitted if the same search result is acquired at and after the next search. In other words, a part of the search process is omitted, so that a search time can be reduced. However, a feature such as a viewing angle and image quality of a query image may be markedly changed depending on a method for acquiring the query image. Thus, the update of the difference area information in step S910 may not be performed. In such a case, the operation in step S910 is deleted from the image search process illustrated in FIG. 9. Operations in steps S911 through S914 are respectively similar to those steps S508 through S511 of the flowchart illustrated in FIG. 5 in the first exemplary embodiment.

Figure 10:
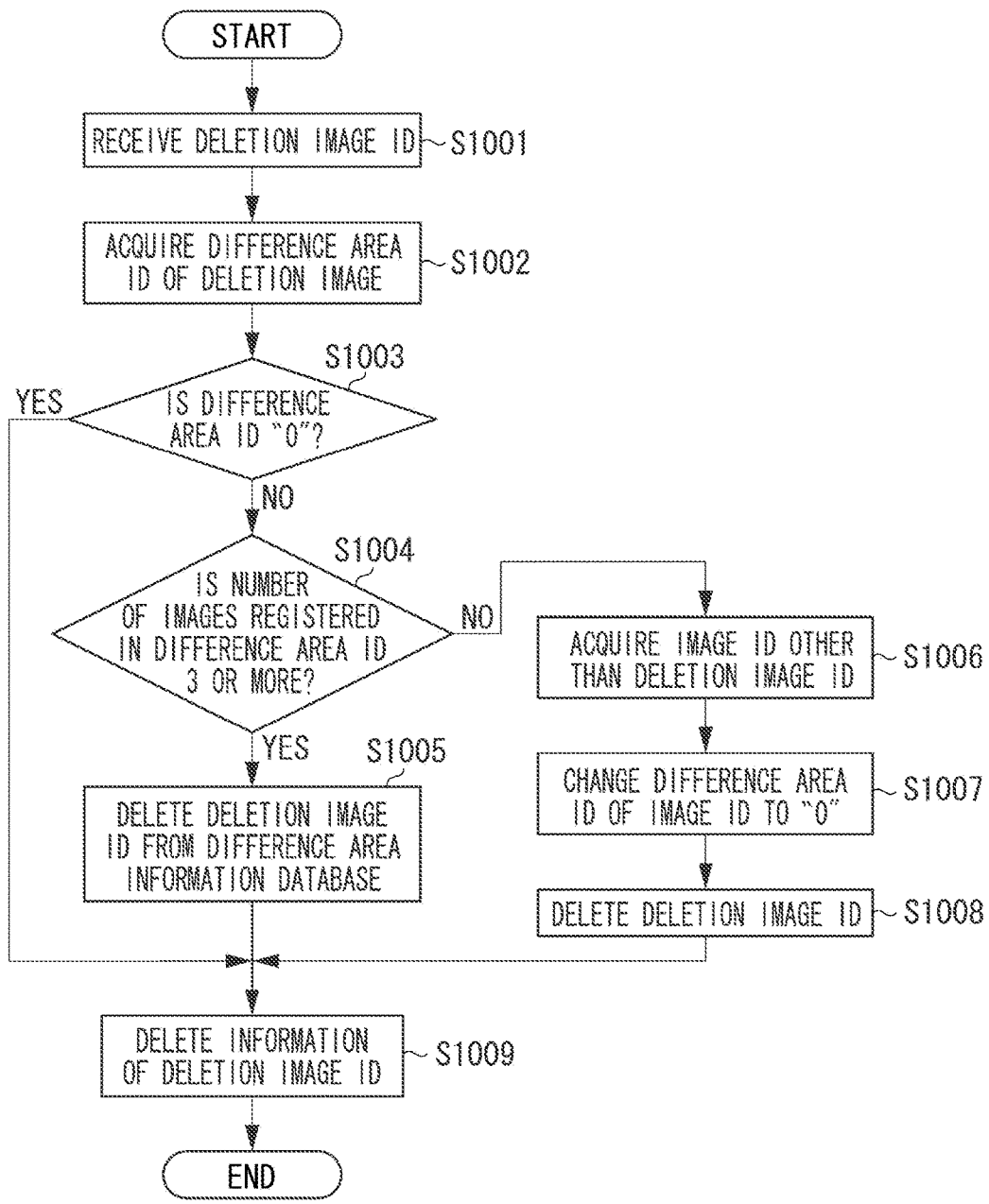
FIG. 10 is a flowchart of an image deletion process performed by the image processing apparatus according to one or more aspects of the present disclosure.

FIG. 10 is a flowchart illustrating one example of an image deletion process performed by the image processing apparatus according to the present exemplary embodiment. The image deletion process is executed when an instruction such as a registered image deletion instruction is received from a user. In step S1001, the deletion image designation unit 210 receives the image ID (deletion image ID) of the registered image to be deleted. Subsequently, in step S1002, the deletion image designation unit 210 refers to the image feature amount database illustrated in FIG. 8A to acquire difference area ID associated with the deletion image ID. In step S1003, the deletion image designation unit 210 determines whether the difference area ID acquired in step S1002 is "0". If the deletion image designation unit 210 determines that the difference area. ID acquired in step S1002 is "0" (YES in step S1003), the processing proceeds to step S1009. On the other hand, if the deletion image designation unit 210 determines that the difference area ID acquired in step S1002 is other than "0" (NO in step S1003), the processing proceeds to step S1004.

In step S1004, the deletion image designation unit 210 refers to the difference area information database to acquire the number of images registered in the difference area ID, and determines whether the number of images is "3" or greater. If the deletion image designation unit 210 determines that the number of images registered in the difference area ID is "3" or greater (YES in step S1004), the processing proceeds to step S1005. If the deletion image designation unit 210 determines that the number of images is "2" (NO in step S1004), the processing proceeds to step S1006.

In step S1005, the deletion unit 211 deletes information of the deletion image ID registered in the difference area ID acquired from the difference area information database. Moreover, the deletion unit 211 decrements the number of images, and registers the decremented number. In step S1009, the deletion unit 211 deletes a row of the deletion image ID from the image feature amount database, and the processing is terminated.

On the other hand, in step S1006, the deletion image designation unit 210 acquires an image ID other than the deletion image ID registered in the acquired difference area ID. Then, in step S1007, the deletion unit 211 changes the difference area ID of the image ID acquired in step S1006 to "0" in the image feature amount database. In step S1008, the deletion unit 211 deletes a row of the difference area ID acquired in step S1002 from the difference area information database. In step S1009, the deletion unit 211 deletes a row of the difference area ID from the image feature amount database, and the processing is terminated.

According to the present exemplary embodiment, therefore, in a case where an image is registered, a similar image is searched from images that have been already registered. If a similar image is present, an area different from the image is estimated, and the difference area and difference area information are registered. When the search is performed based on a query image, a plurality of search result images may be acquired. In such a case, as long as pieces of difference area information of the plurality of search result images are registered, the query image and the search result images are compared with respect to the difference area based on the registered information. According to the present exemplary embodiment, a process load applied at the time of search can be reduced, and duration of time from designation of a query image to acquisition of a search result can be shortened.

[Modification of the Second Exemplary Embodiment]

The second exemplary embodiment has been described using an assumption that an image is rasterized as a registration image when printing is performed using the software that has created a document. Thus, in a case where a plurality of types of documents in which only one portion of a certain document is changed is printed, registration images have the same image size and the same rotation angle. When such a plurality of images registered, pieces of difference area information of these images are registered in a difference area database. Each of FIGS. 8A and 8B illustrates one example of a database used in such a case.

Meanwhile, the registration images may have different image sizes and rotation angles. In such a case, these registration images are treated as separate images, instead of similar images. In other words, in a case where a plurality of registration images has different image sizes or rotation angles, a database in which the corresponding difference area is registered for each image may be used.

Particularly, in a case where a new image is registered, there may be no registered image similar to the new image. In such a case, a registration image is registered in an image feature amount database, and a value "0" is registered in the difference area ID. However, registration is not performed with respect to the difference area information database. This represents, for example, a state in which an image with image ID "4" is registered as illustrated in FIG. 8A. In other words, the image with the image ID "4" has difference area ID of "0", and information of the image with the image ID "4" is not registered the difference area information database illustrated in FIG. 8B.

In a case where a new image is registered, there may be only one similar image in the registered images. In such a case, a value "0" is registered in the difference area ID for the image ID of the similar image in the image feature amount database, and information of the similar image is not registered in the difference area information database. In this case, a new row is added to the difference area information database. Subsequently, difference area information of the registration image and the registered image similar to the registration image as well as the number of difference areas thereof are registered in association with the newly issued difference area ID. Moreover, a value "2" is registered in the number of images, and the image ID of the registration image and the image ID of the registered image similar to the registration image are registered. Then, the registration image is registered together with the difference area ID in the image feature amount database. Moreover, the difference area ID in which the value "0" has been registered for the image ID of the similar image is updated and then registered.

In a case where a new image is registered, there may be two or more similar images in the registered images. In such a case, difference area information of the similar images is registered in the difference area information database. In this case, difference area information of the registration image and the plurality of registered images similar to the registration image is estimated again, and the original difference area information is updated with the newly estimated difference area information. In a case where difference area information of the similar images is provided in a plurality of different difference area IDs, the image IDs registered in the plurality of difference area IDs are collected in one difference area ID, and a row for the other difference area ID are deleted. Moreover, an image ID of the registration image is registered, the number of images is incremented, and the incremented number of images is registered. Moreover, the registration image is registered together with the difference area ID in the image feature amount database.

According to such configurations, even in a case where each registration image has a different size or a different rotation angle, difference area information of the image can be registered in a difference area database. This can reduce a process load applied at the time of search.

A third exemplary embodiment of the present disclosure is described. In the present exemplary embodiment, a feature amount of an area (a common area) common to registration images is registered in a database, and search is performed based on a query image using the registered feature amount. The search is performed using only a feature amount of the common area, instead of all feature amounts registered with respect to registration images. This can further reduce a process load applied at the time of search. In a case where a plurality of search result images is acquired as a result of the search, a query image and each of the search result Images are compared with respect to a difference area in a similar manner to the second exemplary embodiment. Hereinafter, the third exemplary embodiment is described in detail. Components that are similar to those described above in each of the first and second exemplary embodiments will be given the same reference numerals as above and description thereof will be omitted.

Although a hardware configuration and a software configuration of an image processing apparatus according to the present exemplary embodiment are similar to those of the image processing apparatuses according to the first and second exemplary embodiments, processes performed by some functional units of the image processing apparatus according to the present exemplary embodiment differ from those of the image processing apparatuses according to the first and second exemplary embodiments. A registration unit 203 of the present exemplary embodiment has a function of registering an image feature amount of the common area of the registered images in the difference area information database in addition to the function described in the second exemplary embodiment. A search unit 206 searches for a similar image using the feature amount of the common area registered in the difference area information database.

FIGS. 12A and 12B are schematic diagrams respectively illustrating a registration format of an image feature amount database and a registration format of a difference area information database used for the image processing apparatus according to the present exemplary embodiment. The image feature amount database illustrated in FIG. 12A is similar to that illustrated in FIG. 8A of the second exemplary embodiment. The difference area information database illustrated in FIG. 12B has items of the number of feature points, a feature point, and a feature amount in additions to the items in the difference area information database illustrated in FIG. 8B of the second exemplary embodiment. In the items of the number of feature points, the feature point, and the feature amount, a feature point and a feature amount included in a common area of target images are registered. Unlike the second exemplary embodiment, even in a case where a registration image is not similar to any of the registered images, information about the registration image is registered in the difference area information database according to the present exemplary embodiment. In such a case, the number of difference areas is registered as "0", and all of feature points and feature amounts of the registration image are registered. Then, when an image similar to a registered image is registered as a new registration image, the feature point and the feature amount which are present within the difference area are respectively deleted from the information of the feature point and the feature amount registered in the difference area information database. Therefore, only a feature point and a feature amount that are present in the common area are registered.

More particularly, in a case where a new image is registered, there may be no similar image in registered images. In such a case, a registration image is registered in the image feature amount database and also in the difference area information database. Herein, a value "0" is registered in the number of difference areas of the difference area information database. In other words, an image with image ID "4" is registered in the databases as illustrated in FIGS. 12A and 12B. The image with the image ID "4" has a difference area ID of "3", and the difference area ID "3" has the number of difference areas of "0" in the difference area information database.

Moreover, in a case where an image similar to a registered image is newly registered as a registration image, a difference area of the registration image and each of a plurality of registered images similar to the registration image is estimated again, and original difference area information is updated with the newly estimated difference area information. In a case where the difference area information of the registered images similar to the registration image is provided in a plurality of different difference area IDs, the image IDs registered in the plurality of difference area IDs are collected in one difference area ID, and a row for the other difference area ID is deleted. Then, the feature point and the feature amount which are present within the difference area acquired by re-estimation are deleted, so that only a feature point and a feature amount that are present in the common area remain. Moreover, an image ID of the registration image is registered, the number of images is incremented, and the incremented number of images is registered.

Moreover, the registration image and the difference area ID are registered in the image feature amount database.

FIG. 11 is a flowchart illustrating one example of an image registration process performed by the image processing apparatus according to the third exemplary embodiment. Operations in steps S1101 and S1102 are respectively similar to those in steps S301 and S302 of the flowchart illustrated in FIG. 3 of the first exemplary embodiment. In step S1103, the search unit 206 searches for a similar image using the feature amount registered in the difference area database. The search method is similar to the method used in step S503 of the flowchart illustrated in FIG. 5 of the first exemplary embodiment. However, in the present exemplary embodiment, a difference area ID is acquired as a search result.

In step S1104, the search unit 206 determines the number of difference area IDs (search result difference area IDs) with a degree of similarity that is a threshold value or greater. If the search unit 206 determines that the number of search result difference area IDs is "0" (0 in step S1104), the processing proceeds to step S1105. If the search unit 206 determines that the number of search result difference area IDs is "1" (1 in step S1104), the processing proceeds to step S1107. If the search unit 206 determines that the number of search result difference area IDs is "2 or more" (2 OR MORE in step S1104), the processing proceeds to step S1114.

In step S1105, the registration unit 203 registers an image feature amount of the registration image in the difference area information database as illustrated in FIG. 12B. In the operation in step S1105, a new difference area ID is allocated, and then values of "0" and "1" are respectively registered in the number of difference areas and the number of images. Moreover, a new image ID is allocated, and the image ID is registered in an item of an image ID 1. In addition, the number of feature points extracted from the registration image and each feature amount are registered.

Subsequently, in step S1106, the registration unit 203 registers the image feature amount of the registration image in the image feature amount database as illustrated in FIG. 12A, and the processing is terminated. In FIG. 12A, the image ID and the difference area. ID each allocated in step S1105 are respectively registered in the items of the image ID and the difference area ID. The number of feature points, coordinates of each feature point, and each feature amount are registered as similar to those described in the first exemplary embodiment.

In step S1107, it is determined whether the number of images associated with the search result difference area ID is 2 or more. If the number of images associated with the search result difference area ID is 1 (NO in step S1107), the processing proceeds to step S1108. If the number of images associated with the search result difference area ID is 2 or more (YES in step S1107), the processing proceeds to step S1111.

In step S1108, the difference area estimation unit 207 compares the registration image with one image associated with the search result difference ID, and estimates a difference area of these images. The estimation method used herein is similar to that used in step S507 of the flowchart illustrated in FIG. 5 of tree first exemplary embodiment. In step S1109, the registration unit 203 registers the difference area information estimated in step S1108 in the difference area information database as illustrated in FIG. 12B. Moreover, the registration unit 203 changes a value in the item of the number of images to "2" and registers the change. Then, the registration unit 203 registers additional image ID which has been newly allocated in an item of an image ID 2. Subsequently, in step S1110, the deletion unit 211 deletes the feature point within the difference area and the feature amount corresponding to the feature point, and updates the number of feature points by reducing by the number of deleted feature amounts. Then, the processing proceeds to step S1106.

In step S1111, the difference area estimation unit 207 compares the registration image with a common area of the Images associated with the search result, and estimates a difference area therebetween. The estimation method used herein is similar to that used in step S507 of the flowchart illustrated in FIG. 5 of the first exemplary embodiment. Subsequently, in step S1112, the difference area estimation unit 207 determines whether the difference area estimated in step S1111 is the same as the original difference area. If the difference area estimation unit 207 determines that the difference area estimated in step S1111 is the same as the original difference area (YES in step S1112), the processing proceeds to step S1106. On the other hand, if the difference area estimation unit 207 determines that the difference area estimated in step S1111 differs from the original difference area (NO in step S1112), the processing proceeds to step S1113.

In step S1113, the registration unit 203 updates the difference area information with the difference area estimated in step S1111. Then, in step S1110, the deletion unit 211 deletes the feature point inside the newly estimated difference area and the feature amount corresponding to the feature point, thereby updating the number of feature points and a feature amount in the common area. Then, the processing proceeds to step S1106.

In step S1114, the difference area estimation unit 207 determines a logical sum of the plurality of difference areas. Subsequently, in step S1115, the registration unit 203 updates the difference area information database with the difference area information. In other words, the image IDs registered in the plurality of difference area IDs are collected and registered in one difference area ID, and the deletion unit 211 deletes a row of the difference area ID which is no longer needed as a result of the collection. In step S1116, the deletion unmet 211 deletes the feature point inside the difference area and the feature amount corresponding to the feature point, thereby updating the number of feature points and the feature amount. After the operation in step S1116, the processing proceeds to step S1111 in which the difference area estimation unit 207 compares the registration image with an image in a common area other than the difference area determined in step S1115, and estimate a difference area therebetween. After the operation in step S1111, the processing proceeds to step S1112, which is described above.

Figure 13:
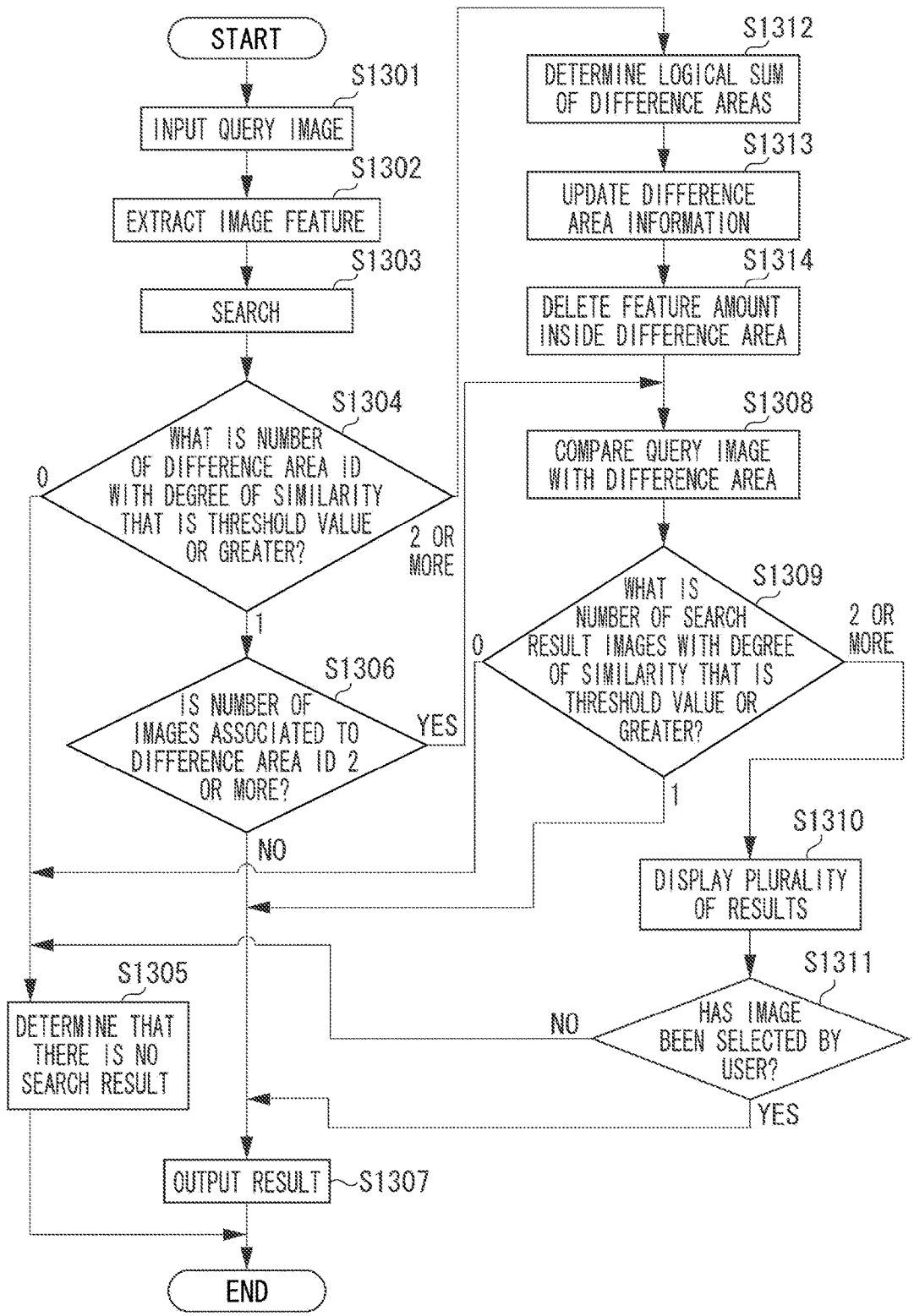
FIG. 13 is a flowchart of an image search process performed by the image processing apparatus according to one or more aspects of the present disclosure.

FIG. 13 is a flowchart illustrating one example of an image search process performed by the image processing apparatus according to the third exemplary embodiment. The image search process of the flowchart illustrated in FIG. 13 includes a part of the process of the flowchart illustrated in FIG. 5 of the first exemplary embodiment and a part of the process of the flowchart illustrated in FIG. 11 of the present exemplary embodiment. In FIG. 13, operations in steps S1301 and S1302 are respectively similar to those in steps S501 and S502 of the flowchart illustrated in FIG. 5 of the first exemplary embodiment.

Although operations in steps S1303 and S1304 of the flowchart illustrated in FIG. 13 of the third exemplary embodiment are respectively similar to those in steps S1103 and S1104 of the flowchart illustrated in FIG. 11, there is a difference between. In the flowchart illustrated in FIG. 11, similar image search is performed on a difference area ID with respect to a registration image. However, in the flowchart illustrated in FIG. 13, similar image search is performed with respect to a query image.

Operations in steps S1305, S1306, and S1307 of FIG. 13 are respectively similar to those performed in step S505 of FIG. 5, step S1107 of FIG. 11, and step S506 of FIG. 5. Moreover, operations in steps S1308 through S1311 of FIG. 13 are respectively similar to those in steps S508 through S511 of FIG. 5. Operations in steps S1312 through S1314 of FIG. 13 are respectively similar to those in steps S1114 through S1116 of FIG. 11. Since a feature such as a viewing angle and image quality of a query image may be markedly changed depending on a method for acquiring the query image, the update of the difference area information in steps S1313 and S1314 may not be performed as similar to the second exemplary embodiment. In such a case, the operations in steps S1313 and S1314 can be deleted from the process it in FIG. 13.

FIG. 14 is a flowchart illustrating one example of an image deletion process performed by the image processing apparatus according to the third exemplary embodiment. Operations in steps S1401 and S1402 of the flowchart illustrated in FIG. 14 are respectively similar to those in steps S1001 and 1002 of the flowchart illustrated in FIG. 10 of the second exemplary embodiment.

In step S1403, the deletion image designation unit 210 refers to the difference area information database, and acquires the number of images registered in difference area ID. Particularly, the deletion image designation unit 210 determines whether that the number of images registered in the difference area ID is 2 or more. If the deletion image designation unit 210 determines that the number of images registered in the difference area ID is 1 (NO in step S1403), the processing proceeds to step S1404. On the other hand, if the deletion image designation unit 210 determines that the number of images registered in the difference area ID is 2 or more (YES in step S1403), the processing proceeds to step S1405.

In step S1404, the deletion unit 211 deletes a row of the difference area ID from the difference area information database. Operations in steps S1405 and S1406 are respectively similar to those in steps S1005 and S1009 of the flowchart illustrated in FIG. 10 of the second exemplary embodiment.

According to the present exemplary embodiment, therefore, a feature amount of an area different from a difference area, i.e., a feature amount of a common area, is registered in a database, and search is performed on information (difference area ID) registered in the database based on a query image. If a plurality of search result images acquired, the query image and each of the plurality of search result images are compared for a difference area therebetween as similar to the second exemplary embodiment. This can further reduces a load applied at the time of search, and can shorten a duration of time from designation of a query image to acquisition of a search result.

[Other Exemplary Embodiment]

Each of the first, second, and third exemplary embodiments has been described using an example in which SIFT or SURF acquired from a luminance image is used as an image feature amount. However, an image feature amount based on a color-difference signal or a red, green, and blue (RGB) color channel can be used. Moreover, a reverse index by an image feature amount can be provided in the database described in each of the exemplary embodiments, so that an image having a feature amount similar to an image feature amount of a query image can be searched quickly. Moreover, each of the above exemplary embodiments has been describes using an example in which the registration image input unit 201 and the query image input unit 205 are separate functional units. However, a single functional unit can acquire and input of both a registration image and a query image.

According to aspects of the present disclosure, software (program) for realizing functions of each of the above-described exemplary embodiments is supplied to system or an apparatus via a network or various types of storage media, so that a computer (or a device such as a CPU and a micro processing unit (MPU)) of the system or the apparatus reads the program to execute a process. Moreover, each of the exemplary embodiments of the present disclosure can be applied to a system including a plurality of devices or an apparatus including a single device. The present disclosure has been with reference to the above-described exemplary embodiments but is not limited thereto. Various modifications (including organic combinations of each of the exemplary embodiments) are possible without departing from the scope of the present disclosure, and these modifications should not be excluded from the scope of the disclosure. In other words, the present disclosure also includes a combination of each of the above-described exemplary embodiments and each of the modifications thereof.

According to the configuration, therefore, each of the exemplary embodiments of the present disclosure can enhance search accuracy when a registered image similar to a query image is searched.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one more the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM) a storage of distributed computing systems, an optical disk (such a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-018420, filed Feb. 2, 2016, which is hereby incorporated by reference herein in its entirety.

What is claimed is:

1. An image processing apparatus comprising:
    at least one processor programmed to cause the image processing apparatus to:
    input an image;
    extract an image feature of the input image;
    store a plurality of registered images that serve as search targets for a query image;
    search for an image similar to the query image from among the plurality of registered images based on the extracted image feature extracted from the query image to acquire a search result image; and
    if a plurality of search result images is acquired, compare a difference area between the plurality of search result images with an area of the query image corresponding to a position of the difference area.

2. The image processing apparatus according to claim 1, further causing the image processing apparatus to estimate the difference area between the plurality of search result images.

3. The image processing apparatus according to claim 2, wherein the difference area is estimated based on pixel values of the plurality of search result images.

4. The image processing apparatus according to claim 3, wherein the difference area is an area including pixels with a difference in the pixel values in the plurality of search result images.

5. The image processing apparatus according to claim 1, wherein a feature point of the input image is extracted, and the image feature for the extracted feature point is extracted.

6. The image processing apparatus according to claim 1, wherein the plurality of registered images and information about the difference area between the plurality of registered images are stored, and
    wherein the difference area between the plurality of search result images with the query image based on the information which is the difference area between the plurality of registered images stored are compared.

7. The image processing apparatus according to claim 6, wherein the plurality of registered images and the information about the difference area between the plurality of registered images are stored in different databases.

8. The image processing apparatus according to claim 6, wherein the plurality of registered images and the information about the difference area between the plurality of registered images in different databases according to image sizes of the plurality of registered images are stored.

9. The image processing apparatus according to claim 6, wherein the information about the difference area includes information of a position of the difference area, a size of the difference area, and a number of the difference areas.

10. The image processing apparatus according to claim 1, wherein an image similar to the query image from among the plurality of registered images based on an image feature extracted from an area different from the difference area is searched.

11. The image processing apparatus according to claim 10, wherein the image feature extracted from the area different from the difference area is stored.

12. An image processing method for an image processing apparatus including a storage unit for storing a plurality of registered images that serve as search targets for a query image, the image processing method comprising:
    inputting a query image;
    extracting an image feature of the input query image;
    searching for an image similar to the query image from among the plurality of registered images based on the extracted image feature of the query image to acquire a search result image; and
    comparing, if a plurality of search result images is acquired by the searching, a difference area between the plurality of search result images with an area of the query image corresponding to a position of the difference area.

13. A non-transitory computer-readable recording medium that stores a program for causing a computer to function as an image processing apparatus comprising:
    at least one processor programmed to cause the image processing apparatus to:
    input an image;
    extract an image feature of the input image;
    store a plurality of registered images that serve as search targets for a query image;
    search for an image similar to the query image from among the plurality of registered images based on the extracted image feature extracted from the query image to acquire a search result image; and
    if a plurality of search result images is acquired, compare a difference area between the plurality of search result images with an area of the query image corresponding to a position of the difference area.

* * * * *